United States Patent [19]

Tatemoto et al.

[11] Patent Number: 4,487,903
[45] Date of Patent: Dec. 11, 1984

[54] FLUORINE-CONTAINING ELASTOMERIC COPOLYMERS, AND THEIR PRODUCTION

[75] Inventors: Masayoshi Tatemoto; Toshihiko Amano, both of Osaka, Japan

[73] Assignee: Daikin Kogyo Co., Ltd., Osaka, Japan

[21] Appl. No.: 427,559

[22] Filed: Sep. 29, 1982

[30] Foreign Application Priority Data

Oct. 22, 1981 [JP] Japan ............... 56-169748

[51] Int. Cl.$^3$ .............. C08F 114/18; C08F 114/22; C08F 114/24; C08F 114/26
[52] U.S. Cl. ............... 526/247; 525/326.3
[58] Field of Search ........................... 526/247

[56] References Cited

U.S. PATENT DOCUMENTS 4,368,308  1/1983  Yamabe et al. ............... 526/247

Primary Examiner—Harry Wong, Jr.
Attorney, Agent, or Firm—Birch, Stewart, Kolasch & Birch

[57] ABSTRACT

A fluorine-containing elastomeric copolymer which comprises units of at least one fluorovinyl ether of the formula:

$$XO(CFYCF_2O)_n CF=CF_2$$

wherein X is $C_1$–$C_3$ perfluoroalkyl, $C_1$–$C_3$ ω-hydroperfluoroalkyl or $C_1$–$C_3$ ω-chloroperfluoroalkyl, Y is hydrogen, chlorine, fluorine, trifluoromethyl, difluoromethyl or chlorodifluoromethyl and n is an integer of 1 to 4 and units of at least one other fluorine-containing monomer copolymerizable therewith, the content of the fluorovinyl ether units being 15 to 50 mol %, which has excellent resistance to low temperatures.

9 Claims, No Drawings

FLUORINE-CONTAINING ELASTOMERIC COPOLYMERS, AND THEIR PRODUCTION

The present invention relates to fluorine-containing elastomeric copolymers, and their production. More particularly, it relates to fluorine-containing elastomeric copolymers comprising units of fluorovinyl ethers and having excellent resistance to low temperatures, and their production.

Ethylene-propylene rubbers (hereinafter referred to as "EPDM") are known to be excellent in resistance to low temperatures. It is also known that the substitution of the hydrogen atoms in EPDM with fluorine atoms results in improvement of resistance to heat and chemicals. Examples of such fluorine-substituted polymers are vinylidene fluoride/hexafluoropropylene copolymer, propylene/tetrafluoroethylene copolymer, etc. However, these fluorine-substituted polymers are inferior to EPDM in resistance to low temperatures and cause various problems when used in cold places.

In order to improve the said drawbacks of fluorine-substituted polymers, it has been proposed to blend them with silicone rubber, followed by covulcanization. In this case, however, silicone rubber is required to be used as a major component, and as the result, advantageous properties inherent to fluorine-substituted polymers themselves are more or less lost. It has also been proposed to incorporate suitable plasticizers into fluorine-substituted polymers, but separation of the plasticizers is frequently caused depending upon the circumstances.

On the other hand, attempt has been made to synthesize perfluoropolyethers having ether linkages in the backbone chain by ionic polymerization of perfluoroolefinic expoxides. In this case, the increase of the content of ether linkages makes the glass transition temperature of the resulting polymer lower. But, polymers of high molecular weight and elasticity are hardly obtainable. Attempt has also been made to produce polymers having ether linkages in the side chains, for instance, by copolymerization of vinylidene fluoride or tetrafluoroethylene with a monomeric compound of the formula: $CF_2=CFOR_f$ (wherein $R_f$ is $CF_3$, $C_2F_5$ or $C_3F_7$). The resulting copolymers are elastomeric, but their glass transition temperatures can be not sufficiently lowered even when the content of vinyl ether units is much increased.

As a result of an extensive study, it has now been found that copolymers of fluorovinyl ethers having a plural number of ether linkages and other monomers copolymerizable therewith, which contain the units of the fluorovinyl ethers in a certain amount or more show sufficiently lowered glass transtion temperatures and excellent resistance to low temperatures.

According to the present invention, at least one fluorovinyl ether of the formula:

$$XO(CFYCF_2O)_nCF=CF_2 \qquad [I]$$

wherein X is $C_1$–$C_3$ perfluoroalkyl, $C_1$–$C_3$ ω-hydroperfluoroalkyl or $C_1$–$C_3$ ω-chloroperfluoroalkyl, Y is hydrogen, chlorine, fluorine, trifluoromethyl, difluoromethyl or chlorodifluoromethyl and n is an integer of 1 to 4, and at least one other fluorine-containing monomer copolymerizable therewith are polymerized, preferably in the presence of a polymerization initiating source, to give a fluorine containing elastomeric copolymer having units of the fluorovinyl ether(s) in an amount of 15 to 50 mol%.

Because the fluorine-containing elastomeric copolymer of the invention contains at least two ether linkages in a side chain, its glass transition temperature is effectively lowered and its low temperature properties are greatly improved.

Hitherto, it is known that the polymerization of a fluoromonomer (e.g. tetrafluoroethylene, chlorotrifluoroethylene, vinyl fluoride) with a fluorovinyl ether of the formula: $X'CF_2CF_2O(CFX'CF_2O)_mCF=CF_2$ (wherein X' is fluorine, chlorine, hydrogen, difluoromethyl, chlorodifluoromethyl or perfluoromethyl and m is an integer of not less 1) affords a copolymer having units of the fluorovinyl ether in an amount of 1 to 3% by weight (Japanese Patent Publication (examined) No. 18340/1967). In this case, a small amount of the fluorovinyl ether is used for improvement of the physical properties (e.g. lowering of the melt viscosity) of the polymer comprising the fluoromonomer. However, the incorporation of units of any fluorovinyl ether into any polymer in such a large amount as used in the present invention for the purpose of improvement of low temperature resistance has never been known.

Among the fluorovinyl ethers [I], preferred are perfluorovinyl ethers. They can be prepared, for instance, from perfluoropropylene oxide according to the following scheme:

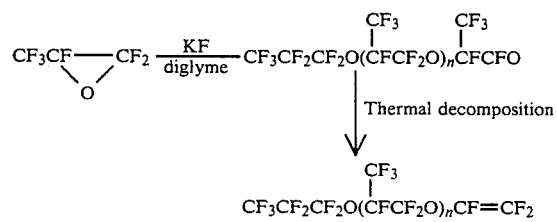

In the formula [I] for the fluorovinyl ethers, n is required to be an integer of 1 to 4. When it is larger than 4, such fluorovinyl ether can be isolated and/or purified with great difficulty. Further, its contribution to the enhancement of the low temperature resistance becomes lower. Still, the fluorovinyl ether may be used alone or in combination. In other words, a mixture of the fluorovinyl ethers having different n values may be used.

As the other fluorine-containing monomers, there may employed vinyl monomers such as tetrafluoroethylene, trifluoroethylene, chlorotrifluoroethylene, vinylidene fluoride, vinyl fluoride, etc.

Polymerization is to be carried out so that the content of the fluorovinyl ether unit in the produced copolymer becomes from 15 to 50 mol%. When the content is less than 15 mol%, the copolymer loses the elastomeric property and is much deteriorated in low temperature resistance.

For the polymerization, various modes such as bulk polymerization, suspension polymerization, solution polymerization or emulsion polymerization may be adopted. In case of solution polymerization, there may be used various solvents such as dichlorofluoromethane, trichlorofluoromethane, chlorodifluoromethane, 1,1,2-trichloro-1,2,2-trifluoroethane (hereinafter referred to as "R-113"), 1,2-dichloro-1,1,2,2-tetrafluoroethane, 1,1,2,2-tetrachloro-1,2-difluoroethane, perfluorocyclobutane and perfluorodimethylcyclobutane. Among them, one having a higher fluorine substitution is favorable. In case of bulk polymerization, suspension polymerization or solution polymerization, organic initiators are normally employed. Preferred organic initiators are highly fluorinated peroxides, especially diacyl peroxides of the formula: $(R_f—COO)_2$ (wherein $R_f$ is perfluoroalkyl, ω-hydroperfluoroalkyl or perchlorofluoroalkyl. In case of emulsion polymerization, the use of a water or oil-soluble peroxide in the presence of a perfluorinated emulsifier may be preferred.

The regulation of the molecular weight of the copolymer to be produced may be achieved by controlling the relationship between the polymerization rate and the amount of the initiator, more preferably by the incorporation of a chain transfer agent into the reaction system. The chain transfer agent may be suitably selected depending upon the kinds of the fluorovinyl ethers [I] and of the other monomers. Specific examples are hydrocarbons of 4 to 6 carbon atoms, alcohols, ethers, organic halides (e.g. $CCl_4$, $CBrCl_3$, $CF_2BrCFBrCF_3$, $CF_2I_2$), etc. When an iodinated fluorocarbon such as $CF_2I_2$, $I(CF_2)_4I$ or $CF_2=CFCF_2CF_2I$ is employed as the chain transfer agent, the iodine atoms bonded to the terminal positions of the copolymer molecules remain in a radically active state so that the resulting copolymer can be advantageously vulcanized with a peroxide as the radical source in the presence of a polyfunctional unsaturated compound such as triallyl isocyanurate or triallyl cyanurate.

The polymerization temperature may be determined by the decomposition temperature of the initiator. The polymerization pressure may be determined by the kind of the other fluorine-containing monomer copolymerizable with the fluorovinyl ether [I]. Thus, those reaction conditions may be appropriately determined by the copolymerization ratio of the starting monomers so as to attain the desired content of the fluorovinyl ether units in the produced copolymer.

On vulcanization of the produced copolymer, an appropriate vulcanization procedure should be chosen depending on the kind of the other fluorine-containing monomer copolymerizable with the fluorovinyl ether [I]. When, for instance, the other fluorine-containing monomer is vinylidene fluoride, trifluoroethylene or vinyl fluoride, the vulcanization may be carried out with polyamine alone or an aromatic polyol-vulcanization accelerator system. When the other fluorine-containing monomer is tetrafluoroethylene or chlorotrifluoroethylene, the said vulcanization system is hardly usable, and the incorporation of a monomer having a vulcanizable site will become necessary. Examples of the monomer having a vulcanizable site are $CF_2=CFO(CF_2)_mCN$, $CF_2=CFO(CF_2)_mBr$, $CF_2=CFO(CF_2)_mI$, $CF_2=CFOCF_2CF_2Cl$, $CF_2=CFCF_2COOH$, $CF_2=CFO(CF_2)_m$

(wherein m is an integer of 1 to 8), etc. In case of a iodinated or brominated fluorocarbon being used as the chain transfer agent in the polymerization, the vulcanization with a peroxide is applicable as stated above.

The fluorine-containing elastomeric copolymer has not only a resistance to heat, chemicals and oils as good as a perfluoroolefin resin but also elasticity at low temperature.

The present invention will be further explained in detail by the following Examples and Comparative Examples.

EXAMPLES 1 AND 2 AND COMPARATIVE EXAMPLE 1

Into a pressure resistant glass made ampoule of 60 ml volume equipped with a valve, a fluorovinyl ether of the formula: $CF_2=CF(OCF_2CF(CF_3))_2OC_3F_7$ (hereinafter referred to as "$\psi_3VE$") in an amount as shown in Table 1 was charged, and a solution of 1,3,5-trichloroperfluorohexanoyl peroxide in R-113 (0.4 g/ml) (0.2 g) was added thereto. The atmosphere in the ampoule was replaced by a comonomer as shown in Table 1. The pressure was adjusted as shown in Table 1. Then, the reaction was carried out at 15° C. while shaking for a period of time as shown in Table 1. The $\psi_3VE$-containing phase became fairly viscous. After completion of the reaction, R-113 (50 g) was added to the reaction mixture. To the resulting solution, acetone was added dropwise for fractionation with the molecular weight, and the precipitated copolymer was recovered. The fraction hardly soluble in R-113 was a soft rubber having a high molecular weight and a high viscosity. The substance soluble in R-113 was a liquid or solid elastomer having $[\eta]$ (in R-113, at 20° C.)=0.1 to 0.4. The highest molecular weight fraction obtained from the R-113 solution by fractionation with acetone showed the physical properties as shown as in Table 2.

TABLE 1

| | φ₃VE (g) | Comonomer | Pressure (kg/cm²G) | Time (hour) | Yield (g) |
|---|---|---|---|---|---|
| Example 1 | 13.5 | Tetrafluoroethylene | 1.5 | 96 | 7.3 |
| Example 2 | 10.1 | Vinylidene fluoride | 2 | 6 | 7.2 |
| Comparative Example 1 | 7.5 | Tetrafluoroethylene | 3.2 | 18 | 4.1 |

TABLE 2

| | $[\eta]$*¹ | φ₃VE Content (mol %)*² | Glass transition temperature (°C.)*³ |
|---|---|---|---|
| Example 1 | 0.2 | 27 | −32 |
| Example 2 | 0.4 | 51 | −44 |
| Comparative Example 1 | — | 13 | 20 |

Notes:
*¹measured in R-113 at 20° C.;
*²determined by elementary analysis;
*³determined by DSC.

COMPARATIVE EXAMPLE 2

In the same manner as in Example 1, $CF_2=CFOCF_3$ and tetrafluoroethylene were polymerized. The produced copolymer having units of $CF_2=CFOCF_3$ in a content of 35 mol% showed a glass transition temperature of −9° C.

In comparison of the produced copolymer with the copolymer obtained in Example 1, it is understood that remarkable depression of the glass transition temperature and improvement of low temperature resistance are attained in Example 1.

EXAMPLE 3

Into a pressure resistant glass made ampoule as in Example 1, ψ₃VE (10.1 g), a solution of 1,3,5-trichloroperfluorohexanoyl peroxide in R-113 (0.4 g/ml) (0.005 ml) and 1,4-diiodoperfluorobutane (0.005 ml) were charged, and the atmosphere in the amoupule was replaced by tetrafluoroethylene. The pressure was raised to 1 kg/cm$^2$G. Then, polymerization was initiated at 15° C. while shaking. After 18 hours, the depression of a pressure of 0.2 kg/cm$^2$G was observed. The said peroxide solution (0.0025 ml) was added to the reaction system, and the pressure was elevated with tetrafluoroethylene to a pressure of 1 kg/cm$^2$G. After 24 hours, the pressure was again decreased by 0.4 kg/cm$^2$G. The peroxide solution (0.0025 ml) was again added to the reaction system, and the pressure was elevated with tetrafluoroethylene to a pressure of 1 kg/cm$^2$G. After 48 hours, the depression of a pressure of 0.4 kg/cm$^2$G was observed. After the pressure was released, R-113 (50 ml) was added to the reaction mixture, followed by agitation. The contents were treated with a large amount of acetone to precipitate the copolymer. The copolymer was collected and dried under reduced pressure to obtain a solid copolymer (7.5 g). The elemental analysis showed a ψ₃VE content of 32 mol%, and the glass transition temperature by DSC was −41° C.

The solid copolymer (2 g) was added to a solution of triallyl isocyanurate (0.1 g) and 2,5-dimethyl-2,5-di(t-butylperoxyl)hexane (0.05 g) in R-113 (50 ml) and dispersed uniformly. The solvent was evaporated at 60° C. The residue was sandwiched with aluminum foils and pressurized at 160° C. for 20 minutes. The resultant product was treated with 5N hydrochloric acid to dissolve the aluminum foils, whereby a colorless, transparent film was obtained. This film was not soluble in R-113 and had a sufficient mechanical strength as the vulcanized rubber.

What is claimed is:

1. A fluorine-containing elastomeric copolymer consisting of units of at least one fluorovinyl ether of the formula:

$$XO(CFYCF_2O)_nCF=CF_2$$

wherein X is C$_1$–C$_3$ perfluoroalkyl, C$_1$–C$_3$ ω-hydroperfluoroalkyl or C$_1$–C$_3$ ω-chloroperfluoroalkyl, Y is hydrogen, chlorine, fluorine, trifluoromethyl, difluoromethyl or chlorodifluoromethyl and n is an integer of 1 to 4 and units of at least one other fluorine-containing monomer selected from the group consisting of tetrafluoroethylene, trifluoroethylene, chlorotrifluoroethylene, vinylidene fluoride and vinyl fluoride, the content of the fluorovinyl ether units being 15 to 50 mol%.

2. The copolymer according to claim 1, which contains tetrafluoroethylene as said other fluorine-containing monomer.

3. The composition according to claim 1, which contains trifluoroethylene as said other fluorine-containing monomer.

4. The composition according to claim 1, which contains chlorotrifluoroethylene as said other fluorine-containing monomer.

5. The composition according to claim 1, which contains vinylidene fluoride as said other fluorine-containing monomer.

6. The composition according to claim 1, which contains vinyl fluoride as said other fluorine-containing monomer.

7. The copolymer according to claim 1, which is a copolymer of CF$_2$=CF(OCF$_2$CF(CF$_3$))$_2$OC$_3$F$_7$ and tetrafluoroethylene.

8. The copolymer according to claim 1, which is a copolymer of CF$_2$=CF(OCF$_2$CF(CF$_3$))$_2$OC$_3$F$_7$ and vinylidene fluoride.

9. The copolymer according to claim 1, wherein said fluorovinyl ether is CF$_2$=CF(OCF$_2$CF(CF$_3$))$_2$OC$_3$F$_7$.

* * * * *